(12) United States Patent
Takemoto

(10) Patent No.: US 9,906,894 B2
(45) Date of Patent: Feb. 27, 2018

(54) INFORMATION PROCESSING APPARATUS AND COMPUTER PROGRAM PRODUCT, CONFIGURED TO DELETE COMMUNICATION INFORMATION, BASED ON DETERMINATION INFORMATION

(71) Applicant: Yuji Takemoto, Tokyo (JP)

(72) Inventor: Yuji Takemoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/371,503

(22) Filed: Dec. 7, 2016

(65) Prior Publication Data

US 2017/0171695 A1    Jun. 15, 2017

(30) Foreign Application Priority Data

Dec. 11, 2015 (JP) .................................. 2015-242374

(51) Int. Cl.
*H04B 7/00* (2006.01)
*H04W 4/00* (2018.01)
(Continued)

(52) U.S. Cl.
CPC ........... *H04W 4/008* (2013.01); *H04L 67/303* (2013.01); *H04W 12/00* (2013.01); *H04W 36/0011* (2013.01)

(58) Field of Classification Search
CPC ... H04W 76/023; H04W 88/06; H04W 4/008; H04W 12/08; H04W 8/005; H04W 84/12;
(Continued)

(56) References Cited

U.S. PATENT DOCUMENTS

| 2015/0350911 A1* | 12/2015 | Pallen | H04W 12/08 726/3 |
| 2016/0112886 A1* | 4/2016 | Malik | H04W 4/008 370/225 |
| 2016/0316420 A1* | 10/2016 | Mustafa | H04W 48/16 |

FOREIGN PATENT DOCUMENTS

JP    2004-096495    3/2004

* cited by examiner

*Primary Examiner* — Golam Sorowar
(74) *Attorney, Agent, or Firm* — Cooper & Dunham LLP

(57) ABSTRACT

An information processing apparatus includes first and second wireless communication interfaces and circuitry. The first wireless communication interface performs wireless communication with a wireless-communication mediation device according to a first wireless communication method. The second wireless communication interface performs, using communication information, wireless communication according to a second wireless communication method. The circuitry acquires, via the first interface, creation information required to create the communication information; creates the communication information including the acquired creation information and determination information indicating whether communication information deletion is to be performed; newly creates, when the wireless communication according to the second wireless communication method has been disconnected, communication information including the creation information in the communication information being former communication information and the determination information indicating that the communication information deletion is to be performed, and sets the newly created communication information instead of the former communication information; and deletes the set communication information.

20 Claims, 14 Drawing Sheets

(51) Int. Cl.
*H04L 29/08* (2006.01)
*H04W 36/00* (2009.01)
*H04W 12/00* (2009.01)

(58) Field of Classification Search
CPC . H04W 24/04; H04W 28/0289; H04W 48/08;
H04W 68/005; H04W 84/18; H04W
88/02; H04W 88/08; H04W 12/04; H04W
12/06; H04W 24/10; H04W 28/0231;
H04L 12/2809; H04L 12/281; H04L
12/2816; H04L 12/282; H04L 2012/2841;
H04L 2012/2849; H04L 43/16; H04L
45/24; H04L 63/18; H04L 65/1069; H04L
67/1042; H04L 67/1068
See application file for complete search history.

INFORMATION PROCESSING APPARATUS AND COMPUTER PROGRAM PRODUCT, CONFIGURED TO DELETE COMMUNICATION INFORMATION, BASED ON DETERMINATION INFORMATION

CROSS-REFERENCE TO RELATED APPLICATIONS

The present application claims priority under 35 U.S.C. § 119 to Japanese Patent Application No. 2015-242374, filed on Dec. 11, 2015. The contents of which are incorporated herein by reference in their entirety.

BACKGROUND OF THE INVENTION

1. Field of the Invention

The present invention relates to an information processing apparatus and a computer program product.

2. Description of the Related Art

There is conventionally known a technique that enables an information device to connect to a network through wireless communication to perform information processing. For example, Japanese Unexamined Patent Application Publication No. 2004-96495 discloses an electronic conferencing system including a conference server and a plurality of terminals, in which the terminals are connected to a network via access points through wireless communication.

For example, when a terminal is connected to a network via an access point through wireless communication, a profile indicating a setting for connecting to the network is installed in the terminal. However, the conventional technique does not include a mechanism to delete an installed profile using basic software (such as an operating system (OS)) or the like of the terminal when the terminal is disconnected from the network. Accordingly, while a profile is remaining without being deleted, a terminal once having connected to the network can connect to the network unconditionally (automatically) when entering again a connection range of the network even after having separated from the network. Therefore, sufficient network security cannot be ensured.

SUMMARY OF THE INVENTION

According to one aspect of the present invention, an information processing apparatus performs wireless communication with a wireless-communication mediation device that mediates connection to a network. The information processing apparatus includes a first wireless communication interface, a second wireless communication interface, and circuitry. The first wireless communication interface performs wireless communication with the wireless-communication mediation device according to a first wireless communication method. The second wireless communication interface performs, using communication information, wireless communication with the wireless-communication mediation device according to a second wireless communication method different from the first wireless communication method. The circuitry acquires, via the wireless communication performed by the first wireless communication interface, creation information required to create the communication information used by the second wireless communication interface; creates the communication information including the acquired creation information and determination information indicating whether communication information deletion is to be performed; newly creates, when the wireless communication with the wireless-communication mediation device according to the second wireless communication method using the communication information has been disconnected, communication information including the creation information included in the communication information being former communication information and the determination information indicating that the communication information deletion is to be performed, and sets the newly created communication information instead of the former communication information; and deletes the newly created communication information thus set, based on the determination information included in the newly created communication information.

BRIEF DESCRIPTION OF THE DRAWINGS

FIGS. 6A to 6C are diagrams illustrating examples of an installation instruction screen;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
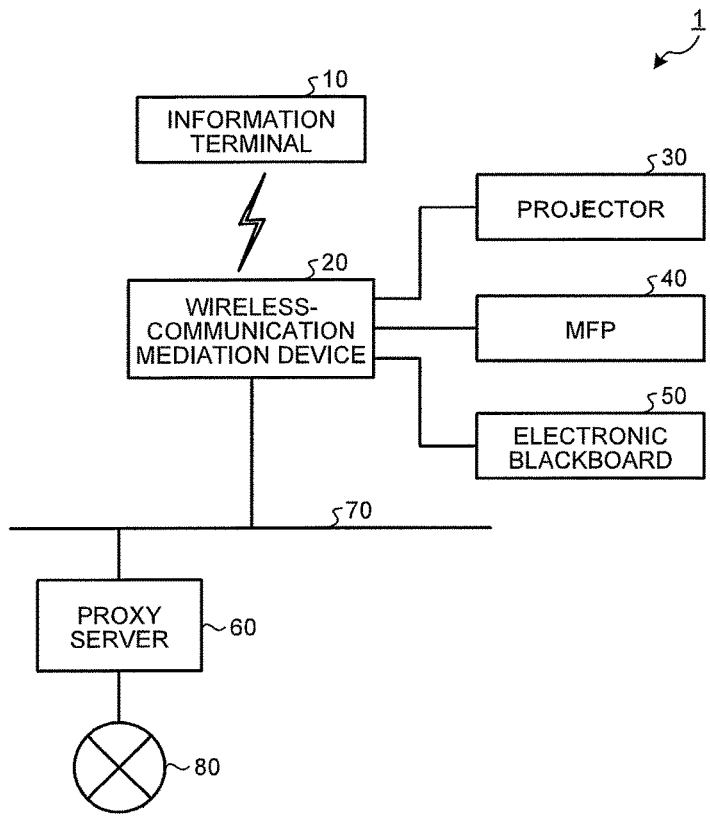
FIG. 1 is a diagram illustrating an example of a configuration of a system.

The terminology used herein is for the purpose of describing particular embodiments only and is not intended to be limiting of the present invention.

As used herein, the singular forms, "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an information processing apparatus that is capable of ensuring sufficient network security.

Embodiments of the present invention will be explained in detail below with reference to the accompanying drawings.

First Embodiment

FIG. 1 is a diagram illustrating an example of a configuration of a system 1 according to an embodiment of the present invention. As illustrated in FIG. 1, the system 1 includes an information terminal 10, a wireless-communication mediation device 20, a projector 30, an MFP (Multi-Function Peripheral) 40, an electronic blackboard 50, a proxy server 60, and the like.

Although one information terminal 10 is illustrated as an example in FIG. 1 for convenience sake, the present embodiment is not limited thereto and an arbitrary number of information terminals 10 can be included in the system 1. Furthermore, although the projector 30, the MFP 40, and the electronic blackboard 50 are illustrated in FIG. 1 as examples of devices other than the information terminal 10 included in the system 1, the devices are not limited thereto and the types and the number of devices included in the system 1 can arbitrarily be changed.

The wireless-communication mediation device 20 is, for example, an access point and has a role in connecting the information terminal 10 that is connected wirelessly, and the projector 30, the MFP 40, and the electronic blackboard 50 that are connected wiredly to an external network 80 such as the Internet via a wired LAN (Local Area Network) 70 and the proxy server 60. In this example, the wireless-communication mediation device 20 can connect the respective devices included in the system 1 to the network 80 using a wireless communication technique such as Bluetooth (registered trademark) or WiFi (registered trademark).

The wireless-communication mediation device 20 also has a dynamic host configuration protocol (DHCP) server function of distributing an Internet Protocol (IP) address for identifying a device on the network 80 to a device (such as the information terminal 10) connected wirelessly or wiredly. The wireless-communication mediation device 20 also can set permission/non-permission of accesses from an existing network (such as the wired LAN 70 or the network 80) to devices (such as the information terminal 10) connected to the wireless-communication mediation device 20, or permission/non-permission of accesses from devices connected to the wireless-communication mediation device 20 to an existing network individually with respect to each device according to an access control rule previously defined by an operation of a user (administrator) or the like. The access control rule can be fixed or can be variably set by an operation of a user (administrator) or the like.

The information terminal 10 as an example of "information processing apparatus" is described next. The information terminal 10 according to the present embodiment includes a portable multifunctional device (smart device) such as a smartphone or a tablet.

Figure 2:
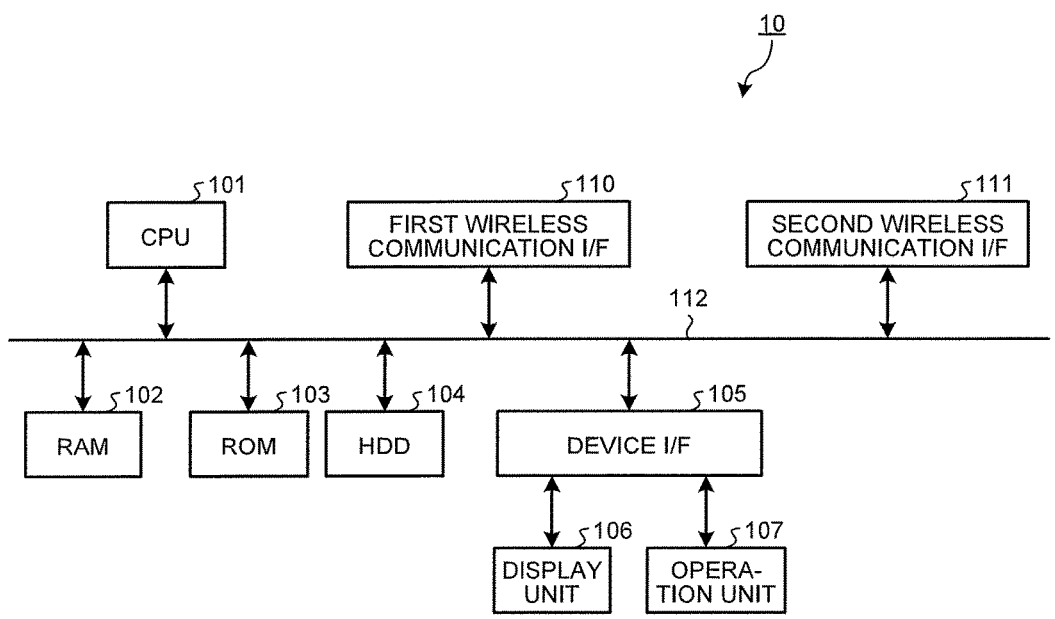
FIG. 2 is a diagram illustrating an example of a hardware configuration of an information terminal.

FIG. 2 is a diagram illustrating an example of a hardware configuration of the information terminal 10. As illustrated in FIG. 2, the information terminal 10 includes a central processing unit (CPU) 101, a random access memory (RAM) 102, a read only memory (ROM) 103, a hard disk drive (HDD) 104, a device interface (I/F) 105, a first wireless communication I/F 110, and a second wireless communication I/F 111, which are connected to each other with a bus 112. A display unit 106 and an operation unit 107 are connected to the device I/F 105.

The CPU 101 is a computing unit and generally controls an entire operation of the information terminal 10. The RAM 102 is a volatile storage medium from/to which information can be read/written rapidly, and is used as a work area when the CPU 101 processes information. The ROM 103 is a read-only non-volatile storage medium and has programs such as firmware stored therein. The HDD 104 is a non-volatile storage medium from/to which information can be read/written, and has an OS and various control programs and applications stored therein.

In this example, the OS is basic software for providing a basic function of controlling hardware included in the information terminal 10. An application is software for operating hardware resources included in the information terminal 10 to provide predetermined functions. In the present embodiment, an application (hereinafter, may be referred to as "wireless connection application") for enabling an easy connection to the network 80 via the wireless-communication mediation device 20 is installed in advance as well as the OS described above in the information terminal 10. The wireless connection application is an example of "program". The OS installed in the information terminal 10 of the present embodiment is, for example, iOS (registered trademark).

The device I/F 105 is an interface for connecting the display unit 106 and the operation unit 107 to the bus 112. The display unit 106 is a visual user interface for displaying various types of information and is constituted of, for example, an liquid crystal display (LCD). The operation unit 107 is a user interface for enabling a user to input various types of information to the information terminal 10, such as a keyboard or a mouse.

The first wireless communication I/F 110 is an interface for enabling wireless communication according to a first wireless communication method to perform wireless communication with the wireless-communication mediation device 20 with a first wireless communication distance. While being an interface for enabling wireless communication using a function of Bluetooth (registered trademark) in this example, the first wireless communication I/F 110 is not limited thereto. The second wireless communication I/F 111 is an interface for enabling second wireless communication to wirelessly communicate with the wireless-communication mediation device 20 with a second wireless communication distance longer than the first wireless communication distance. While being an interface for enabling wireless communication using a function of WiFi (registered trademark) in this example, the second wireless communication I/F 111 is not limited thereto.

Figure 3:
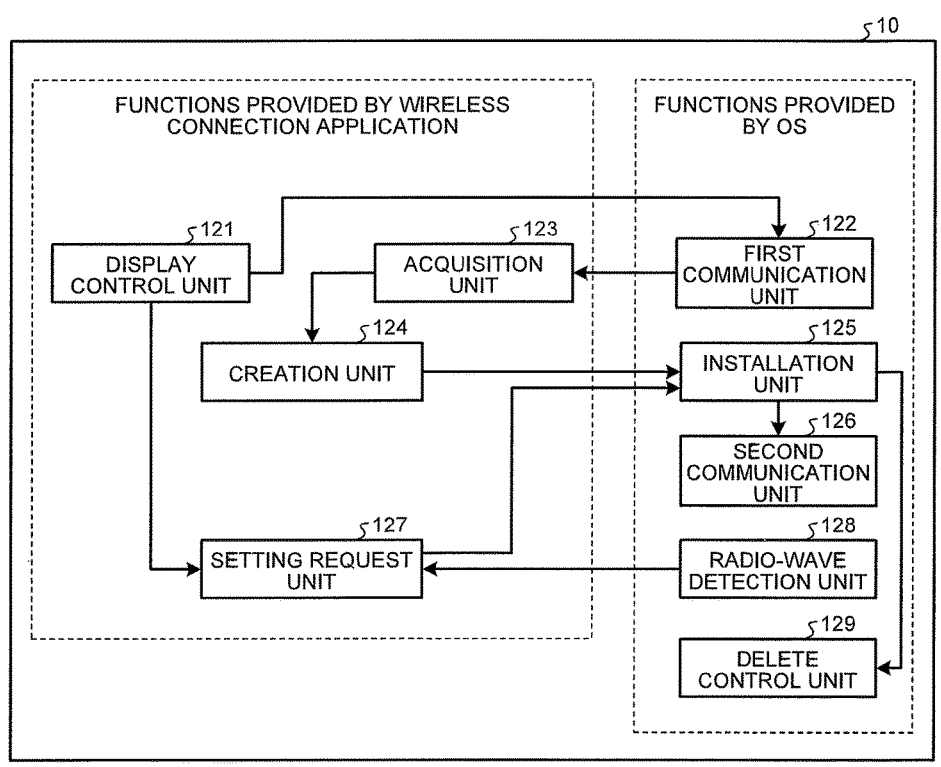
FIG. 3 is a diagram illustrating an example of functions included in the information terminal.

FIG. 3 is a diagram illustrating an example of functions included in the information terminal 10. As illustrated in FIG. 3, the information terminal 10 has a display control unit 121, a first communication unit 122, an acquisition unit 123, a creation unit 124, an installation unit 125, a second communication unit 126, a setting request unit 127, a radio-wave detection unit 128, and a delete control unit 129. While the functions related to the present embodiment are mainly illustrated in FIG. 3 for convenience sake, functions included in the information terminal 10 are not limited thereto. In this example, the first communication unit 122 performs wireless communication with the wireless-communication mediation device 20 according to the first wireless communication method described above. As described above, the wireless communication with the wireless-communication mediation device 20 according to the first wireless communication method is wireless communication using the function of Bluetooth (registered trademark). The second communication unit 126 performs wireless communication with the wireless-communication mediation device 20 according to the second wireless communication method described above. As described above, the wireless communication with the wireless-communication mediation device 20 according to the second wireless communication method is wireless communication using the function of WiFi (registered trademark).

In the example illustrated in FIG. 3, respective functions of the display control unit 121, the acquisition unit 123, the creation unit 124, and the setting request unit 127 are provided by the wireless connection application. More specifically, the respective functions of the display control unit 121, the acquisition unit 123, the creation unit 124, and the setting request unit 127 are implemented by execution of the wireless connection application by the CPU 101.

Respective functions of the first communication unit 122, the installation unit 125, the second communication unit 126, the radio-wave detection unit 128, and the delete control unit 129 are provided by the OS. More specifically, the respective functions of the first communication unit 122, the installation unit 125, the second communication unit 126, the radio-wave detection unit 128, and the delete control unit 129 are implemented by execution of the OS by the CPU 101.

Figure 4:
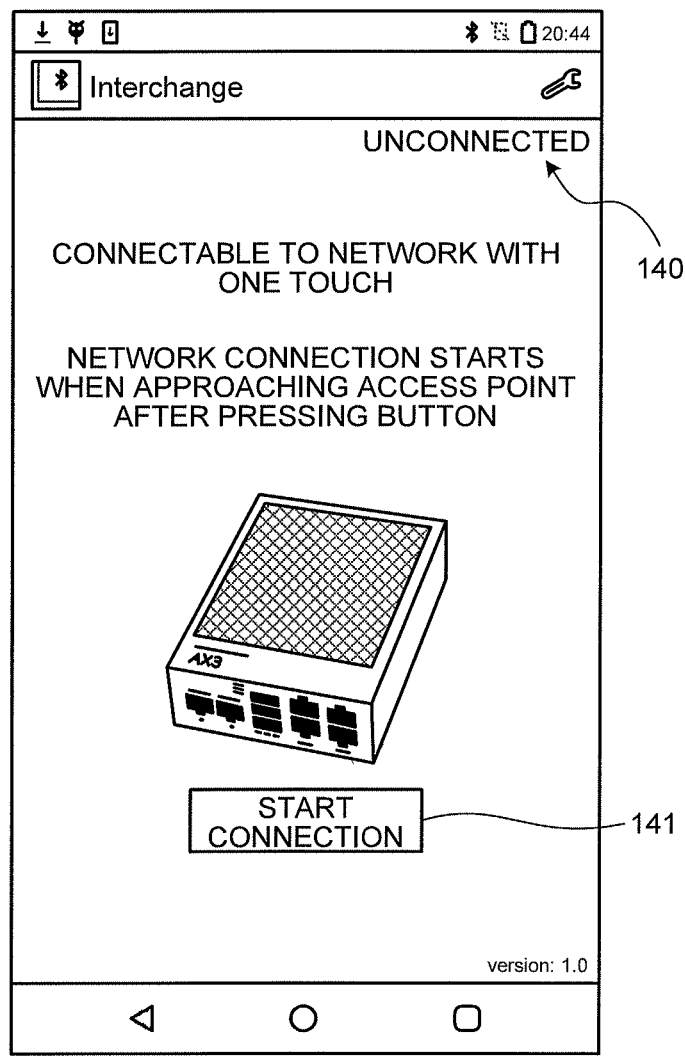
FIG. 4 is a diagram illustrating an example of an initial screen.
Figure 5:
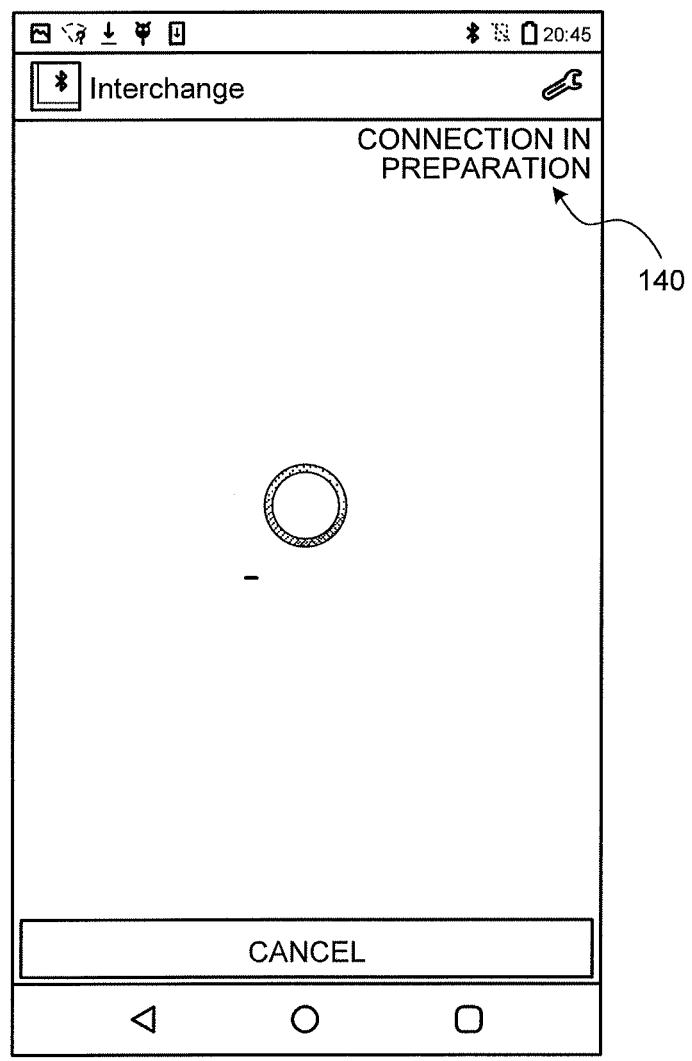
FIG. 5 is a diagram illustrating an example of a connection preparation screen.

The display control unit 121 executes control to display various screens on the display unit 106 and also receives operations of a user via the screens. In this example, an icon corresponding to the wireless connection application (an example of a display component (user interface (UI) component) for invoking functions of the wireless connection application) is placed on a home screen displayed on the display unit 106. The wireless connection application starts when an operation of pressing the icon is received. The display control unit 121 executes, for example, control to display an initial screen of the wireless connection application as illustrated in FIG. 4 on the display unit 106 at the time of start of the wireless connection application. At least connection status information 140 indicating that the device is unconnected to the network 80 and a button 141 for instructing a user to start connection to the network 80 are displayed on the initial screen. When receiving pressing of the button 141 on the initial screen, the display control unit 121 executes control to display a connection preparation screen indicating that connection to the network 80 is in preparation as illustrated in FIG. 5 on the display unit 106. In the example illustrated in FIG. 5, the connection status information 140 indicating that connection to the network 80 is in preparation is displayed on the connection preparation screen. The display control unit 121 notifies the first communication unit 122 described later of information (first operation information) indicating that pressing of the button 141 on the initial screen has been received.

The descriptions are continued with reference to FIG. 3. In this example, the first communication unit 122 starts the operation with reception of a notification of the first operation information described above from the display control unit 121 as a trigger and starts a process of detecting (receiving) a signal from the wireless-communication mediation device 20 to perform wireless communication with the wireless-communication mediation device 20 according to the first wireless communication method. Furthermore, in this example, the wireless-communication mediation device 20 periodically issues a paring request (an example of the signal for performing wireless communication with the wireless-communication mediation device 20 according to the first wireless communication method) to request mutual authentication (paring) with the other party terminal (the information terminal 10 in this example) present in a predetermined range (within a 10-cm radius in this example) around the wireless-communication mediation device 20. The first communication unit 122 having received the paring request performs a negotiation according to a procedure (protocol) of Bluetooth (registered trademark) with the wireless-communication mediation device 20 and establishes a communication line for performing wireless communication with the wireless-communication mediation device 20 according to the first wireless communication method. In this way, the information terminal 10 can perform wireless communication with the wireless-communication mediation device 20 according to the first wireless communication method.

The acquisition unit 123 acquires creation information necessary for creating communication information (also "profile" in following descriptions) to perform wireless communication according to the second wireless communication method described above via the wireless communication by the first communication unit 122. In this example, the wireless-communication mediation device 20 transmits the creation information to the information terminal 10 being the other party of the wireless communication according to the first wireless communication method. Therefore, the first communication unit 122 having established the communication line for performing wireless communication with the wireless-communication mediation device 20 according to the first wireless communication method can receive the creation information from the wireless-communication mediation device 20 and can transfer the received creation information to the acquisition unit 123. In this way, the acquisition unit 123 can acquire the creation information. In this example, the creation information includes at least an SSID (Service Set IDentifier) identifying the network 80 and a password indicating an encryption key.

The creation unit 124 creates communication information including the creation information acquired by the acquisition unit 123 and determination information indicating whether profile deletion (communication information deletion) is to be performed. In this example, the determination information included in a profile is an effective time indicating a time during which the profile is effective, and a profile includes at least an effective time indicating a time during which the profile is effective, an SSID, and a password. More specifically, a profile includes an effective time, an SSID, a password, the type of an encryption method, and a unique ID uniquely identifying the profile. In this example, the creation unit 124 decides an effective time according to an initial setting. For example, the initial setting can be a setting to set the effective time to "three hours". The initial setting can arbitrarily be changed by an operation of a user or the like. After creating a profile, the creation unit 124 requests the installation unit 125 to install the created profile.

Figures 6A, 6B, 6C:
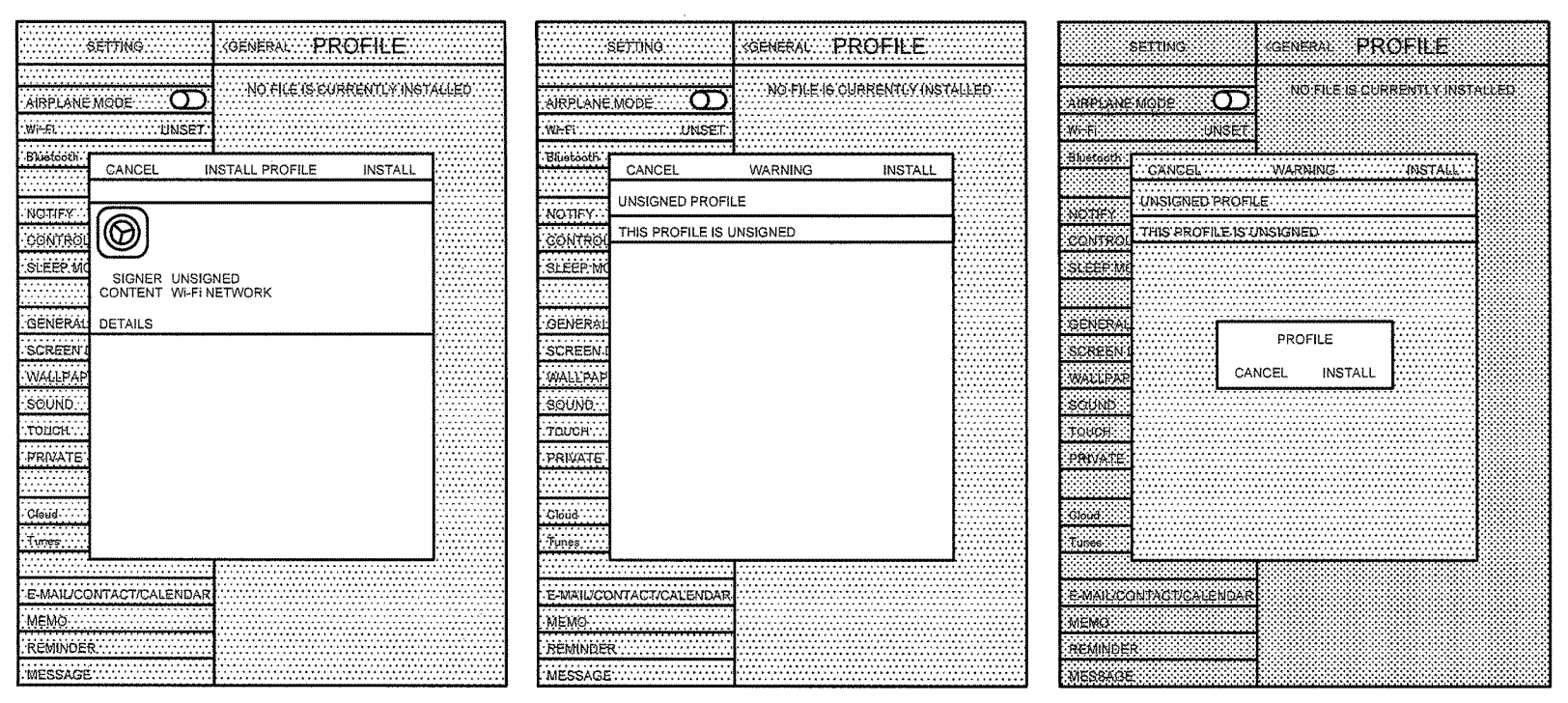

In this example, before performing installation of the profile, the installation unit 125 having received the request from the creation unit 124 executes control to sequentially display installation instruction screens for receiving an instruction to install a profile as illustrated in FIGS. 6A to 6C on the display unit 106. When an instruction to install a profile (an operation with respect to a display part of "INSTALL" on an upper right of the screen in FIG. 6A, an operation with respect to a display part of "INSTALL" on an upper right of the screen in FIG. 6B, and an operation with respect to a display part of "INSTALL" on a center of the screen in FIG. 6C) is received through three installation instruction screens, the installation unit 125 executes control to install the profile created by the creation unit 124.

The second communication unit 126 performs wireless communication with the wireless-communication mediation device 20 according to the second wireless communication method described above using the profile installed by the installation unit 125 (in other words, the profile created by the creation unit 124). In this example, the OS also has a function of starting time measurement when the device is connected to the network 80 through the wireless communication according to the second wireless communication method (when a communication line for performing wireless communication according to the second wireless communication method is established), and of decreasing the effective time included in the profile according to the measured time. When the effective time becomes zero, the second communication unit 126 disconnects the wireless communication with the wireless-communication mediation device 20 according to the second wireless communication method. The OS also has a function of deleting the profile of which the effective time has become zero.

Figure 7:
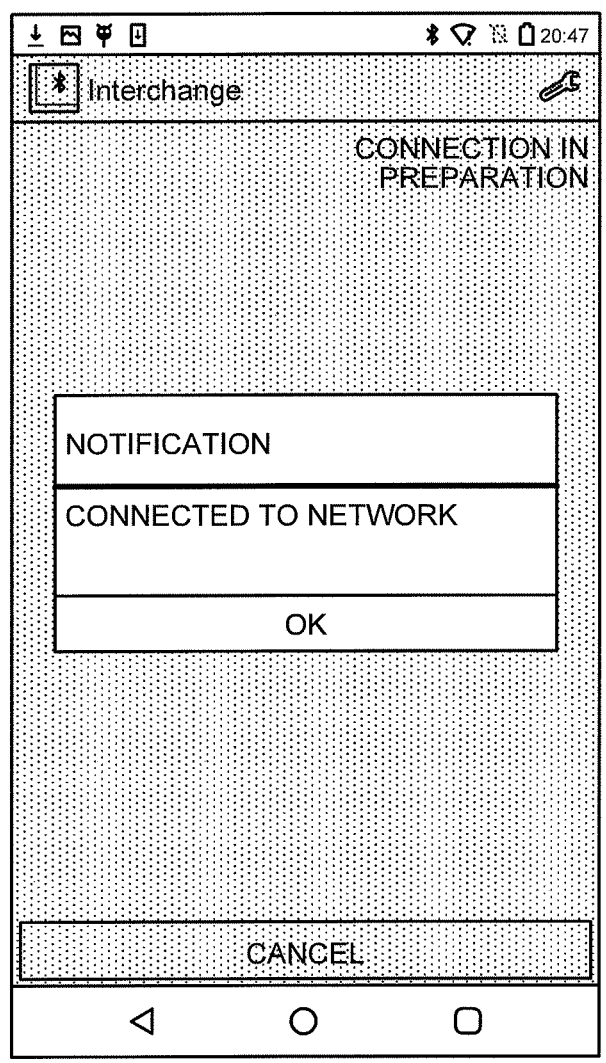
FIG. 7 is a diagram illustrating an example of a connection success screen.
Figure 8:
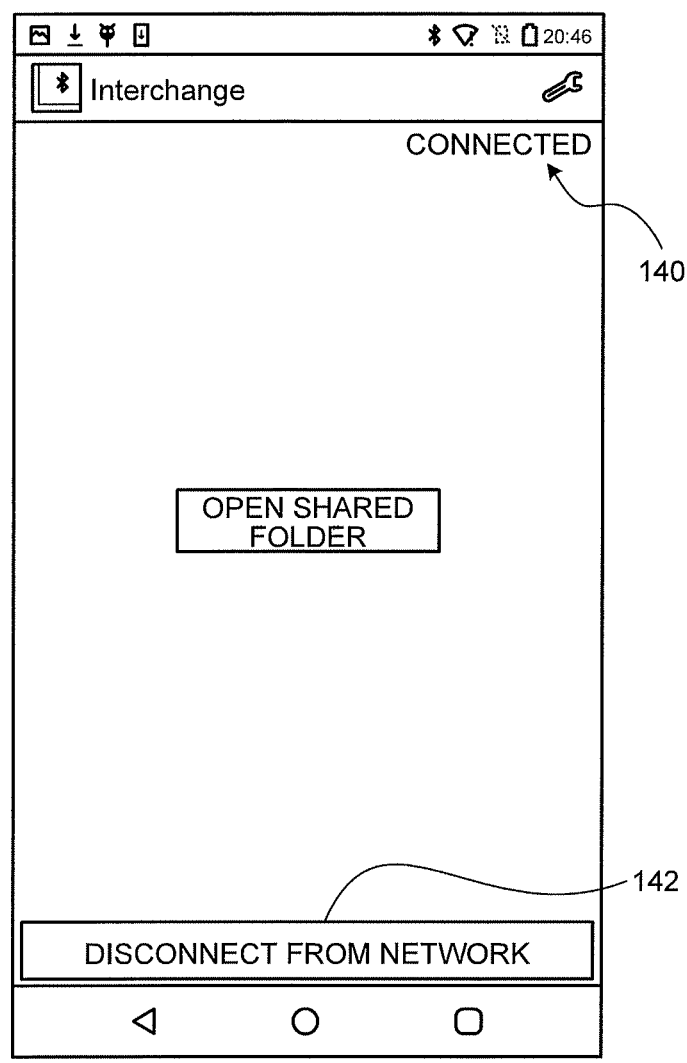
FIG. 8 is a diagram illustrating an example of a connected screen.

In the present embodiment, when connection to the network 80 via the wireless-communication mediation device 20 is successfully performed (when a communication line for performing wireless communication according to the second wireless communication method is established by the second communication unit 126), the display control unit 121 can execute control to display a connection success screen indicating a screen for notifying of a success of the connection to the network 80 as illustrated in FIG. 7 on the display unit 106. Upon reception of pressing of an "OK" button on the connection success screen, the display control unit 121 also can execute control to display a connected screen indicating a screen after the success of the connection to the network 80, for example, as illustrated in FIG. 8 on the display unit 106, or can execute control to display a browser screen (Web page) corresponding to a Uniform Resource Locator (URL) designated in advance in an initial setting on the display unit 106. In this example, the explanation is given about an example in a case where the connected screen illustrated in FIG. 8 is displayed on the display unit 106e. In the example of FIG. 8, the connection status information 140 indicating that the connection to the network 80 is completed is displayed on the connected screen. A button 142 for instructing to disconnect from the network 80 (disconnect the wireless communication according to the second wireless communication method) is also displayed on the connected screen.

Figure 9:
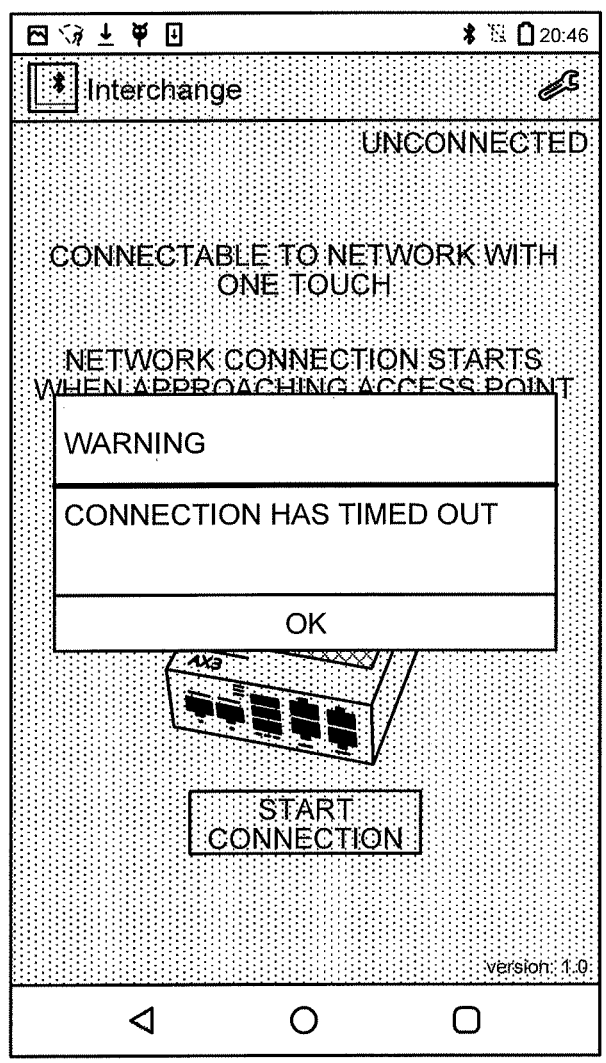
FIG. 9 is a diagram illustrating an example of a first error screen.
Figure 10:
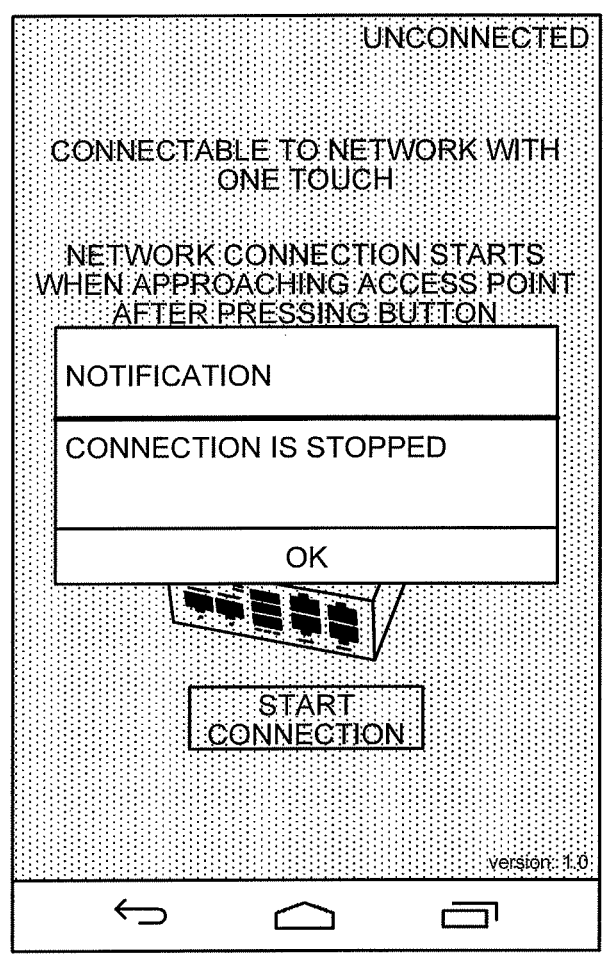
FIG. 10 is a diagram illustrating an example of a second error screen.

In this example, the display control unit 121 executes control to display a first error screen indicating a connection failure due to time-out as illustrated in FIG. 9 on the display unit 106 when connection to the network 80 is not successfully performed after a certain time (30 seconds, for example) has elapsed from reception of pressing of the button 141 on the initial screen illustrated in FIG. 4. Furthermore, in this example, when pressing of a "CANCEL" button on the connection preparation screen illustrated in FIG. 5 is received, the display control unit 121 notifies the first communication unit 122 and the second communication unit 126 of second operation information indicating reception of pressing of the "CANCEL" button on the connection preparation screen, and also executes control to display a second error screen indicating that the connection is canceled as illustrated in FIG. 10 on the display unit 106. The first communication unit 122 and the second communication unit 126 having received the notification of the second operation information described above stop respective connection processes, and the first communication unit 122 transitions to a standby state again. When pressing of an "OK" button displayed on the first error screen or the second error screen is received, the display control unit 121 executes control to display the initial screen illustrated in FIG. 4 again on the display unit 106.

Figure 11:
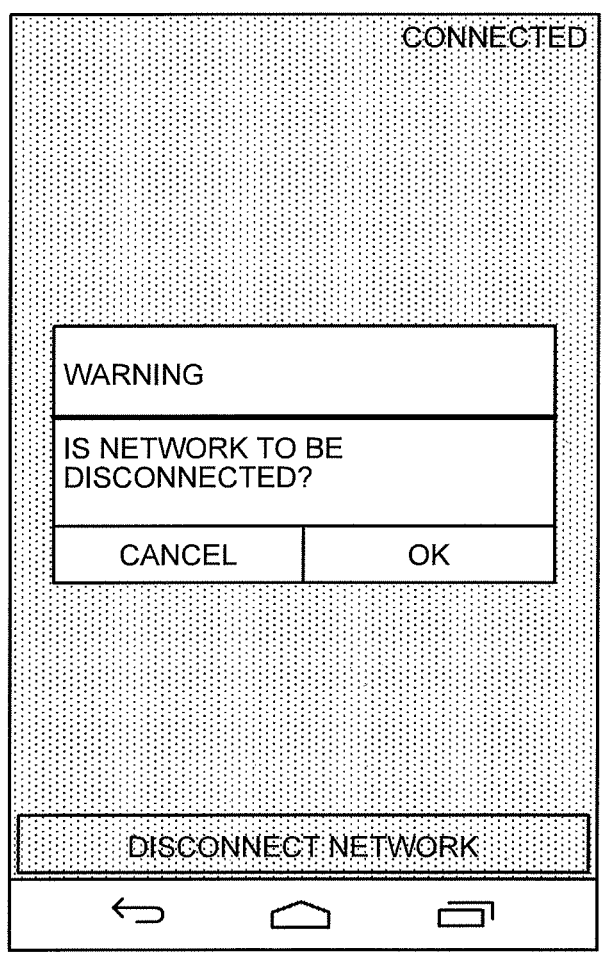
FIG. 11 is a diagram illustrating an example of a disconnection confirmation screen.
Figure 12:
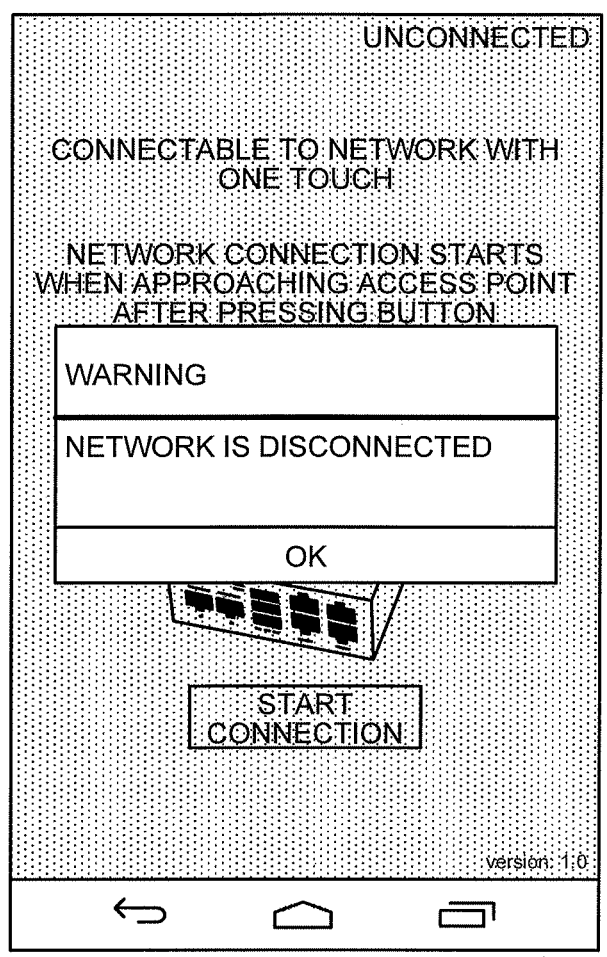
FIG. 12 is a diagram illustrating an example of a disconnection informing screen.

Referring back to FIG. 3, the descriptions are continued. When the wireless communication with the wireless-communication mediation device 20 according to the second wireless communication method using the profile created by the creation unit 124 is disconnected, the setting request unit 127 requests the OS (the installation unit 125 in this example) being an example of the basic software to create a profile including the creation information included in the profile created by the creation unit 124 and the determination information indicating that the communication information deletion is to be performed, and to set the created profile instead of the former profile. The installation unit 125 having received the request performs setting of the new profile created by the setting request unit 127. In this example, the determination information indicating that the profile deletion is to be performed is the effective time indicating zero. In the present embodiment, when an instruction to disconnect the wireless communication with the wireless-communication mediation device 20 according to the second wireless communication method described above is received, the setting request unit 127 creates a new profile including the creation information included in the profile used for the wireless communication and the determination information (the effective time indicating zero) indicating that the profile deletion is to be performed, and requests the installation unit 125 to set the newly created profile instead of the former profile. In this example, when pressing of the button 142 displayed on the connected screen described above is received, the display control unit 121 executes control to display a disconnection confirmation screen indicating a screen for confirming that the connection to the network 80 is to be disconnected as illustrated in FIG. 11. When receiving pressing of an "OK" button displayed on the disconnection confirmation screen, the setting request unit 127 creates a new profile including the creation information included in the profile used for the wireless communication and the effective time indicating zero even when the effective time included in the profile, is left. The second communication unit 126 disconnects the communication line for performing the wireless communication with the wireless-communication mediation device 20 according to the second wireless communication method. The display control unit 121 executes control to display a disconnection informing screen indicating a screen for informing of disconnection from the network 80 as illustrated in FIG. 12 on the display unit 106. When receiving pressing of an "OK" button displayed on the disconnection informing screen, the display control unit 121 executes control to display again the initial screen illustrated in FIG. 4 on the display unit 106.

In the present embodiment, the setting request unit 127 determines that wireless communication with the wireless-communication mediation device 20 according to the second wireless communication method has been disconnected based on the intensity of radio waves received from the wireless-communication mediation device 20. More specifically, the setting request unit 127 periodically receives a detection result of radio waves from the radio-wave detection unit 128 that detects the intensity of radio waves received from the wireless-communication mediation device 20, and can determine that wireless communication with the wireless-communication mediation device 20 according to the second wireless communication method has been disconnected when the intensity of the radio waves is equal to or lower than a threshold. When it is determined that wireless communication with the wireless-communication mediation device 20 according to the second wireless communication method has been disconnected, the setting request unit 127 creates a new profile including the creation information included in the profile used for the wireless communication and the effective time indicating zero even when the effective time included in the profile is left.

After creating a new profile (profile including the creation information included in the former profile and the effective time indicating zero) in the manner described above, the setting request unit 127 requests the installation unit 125 to install the newly created profile. More specifically, the setting request unit 127 designates a unique ID of the newly created profile and then transmits an overwrite request for requesting to write the profile newly created by the setting request unit 127 over a profile corresponding to the designated unique ID to the installation unit 125. The installation unit 125 having received the request installs the profile newly created by the setting request unit 127. More specifically, the installation unit 125 selects a profile including a unique ID coincident with the unique ID included in the overwrite request received from the setting request unit 127 from among installed profiles. Before performing overwrite of the selected profile, the setting request unit 127 executes control to sequentially display installation instruction screens for receiving an instruction to install a profile as illustrated in FIGS. 6A to 6C on the display unit 106. When an instruction to install a profile is received through the three installation instruction screens, the installation unit 125 writes the profile newly created by the setting request unit 127 over the profile selected in the manner described above. Subsequently, the installation unit 125 requests the delete control unit 129 to delete a profile. The delete control unit 129 having received this request deletes the newly created profile thus installed, based on the determination information included in the profile. More specifically, the delete control unit 129 deletes a profile that includes the effective time indicating zero from among the installed profiles. In other words, the delete control unit 129 deletes a profile that includes the determination information indicating that the profile deletion is to be performed, from among the installed profiles.

Figure 13:
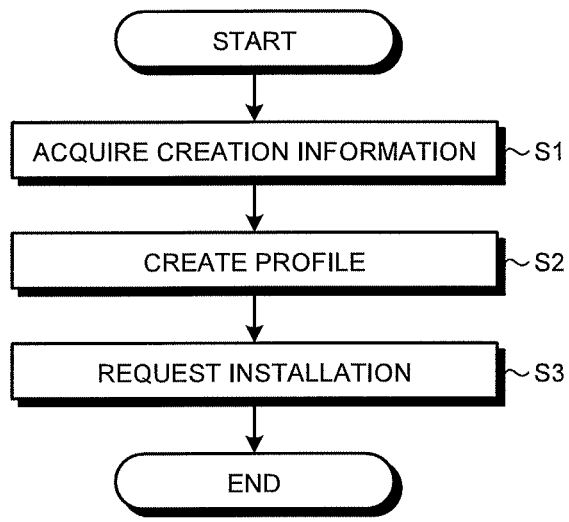
FIG. 13 is a flowchart illustrating an example of a process performed by a wireless connection application to create a profile.

FIG. 13 is a flowchart illustrating an example of a process performed by the wireless connection application to create a profile. As illustrated in FIG. 13, the acquisition unit 123 first acquires the creation information described above from the first communication unit 122 (Step S1). Subsequently, the creation unit 124 creates a profile based on the creation information acquired at Step S1 (Step S2). Next, the creation unit 124 requests the installation unit 125 (the function provided by the OS) to install the profile created at Step S2 (Step S3). Specific processes at respective steps are as described above.

Figure 14:
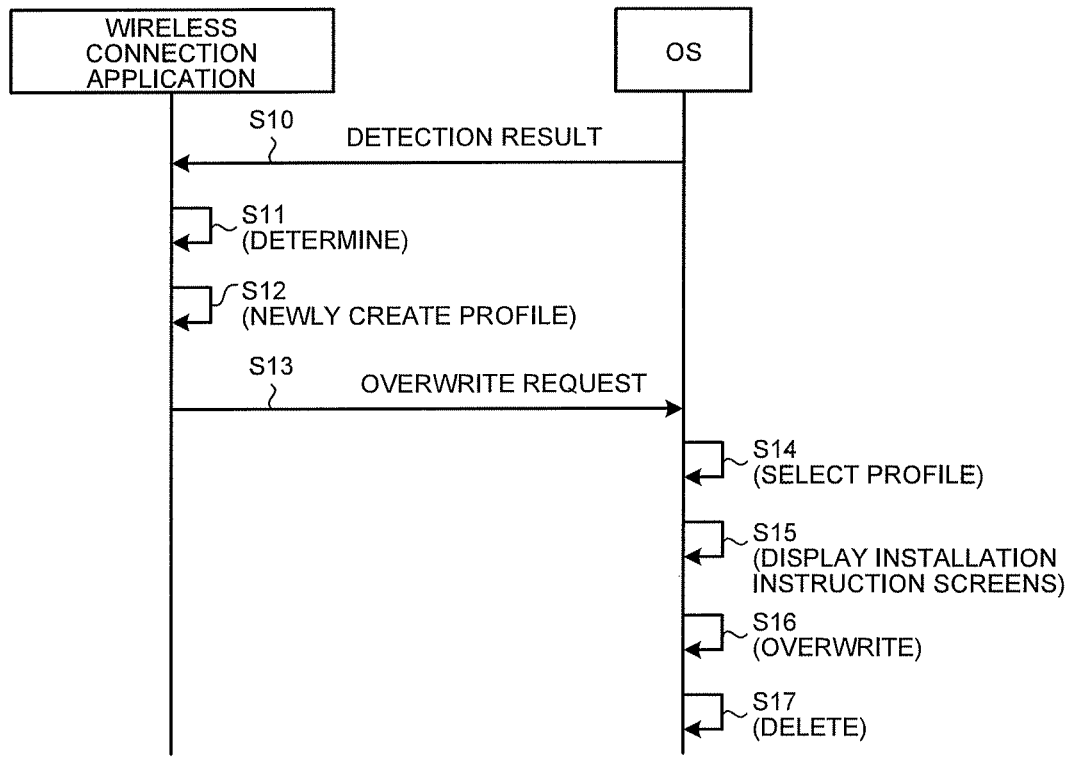
FIG. 14 is a sequence diagram illustrating an example of an operation procedure performed by the information terminal.

FIG. 14 is a sequence diagram illustrating an example of an operation procedure performed by the information terminal 10 according to the present embodiment. As described above, the OS (the radio-wave detection unit 128) periodically notifies the wireless connection application of a detection result of the intensity of radio waves received from the wireless-communication mediation device 20 (Step S10). The wireless connection application (the setting request unit 127) determines whether wireless communication with the wireless-communication mediation device 20 according to the second wireless communication method has been disconnected based on a detection result notified from the OS (Step S11). The following description is given about an example in a case where it is determined that wireless communication with the wireless-communication mediation device 20 according to the second wireless communication method has been disconnected. Subsequently, the wireless connection application (the setting request unit 127) creates a new profile including the creation information included in the profile used for the wireless communication and the determination information (the effective time indicating zero) indicating that the profile deletion is to be performed (Step S12). Subsequently, the wireless connection application transmits the overwrite request described above to the OS (the installation unit 125) (Step S13).

The OS (the installation unit 125) having received the overwrite request from the wireless connection application selects a profile including a unique ID coincident with a unique ID included in the received overwrite request from among installed profiles (Step S14). Next, the OS executes control to sequentially display the three installation instruction screens described above on the display unit 106 (Step S15). In the following descriptions, a case where an instruction to install a profile is received through the three installation instruction screens is assumed. Subsequently, the OS writes the profile newly created at Step S12 over the profile selected at Step S14 (Step S16). Then, the OS deletes the profile based on the determination information indicating that the profile deletion is to be performed (Step S17).

When wireless communication with the wireless-communication mediation device 20 according to the second wireless communication method is disconnected at the time of start of the wireless connection application described above and also when a profile is present (remains), the setting request unit 127 according to the present embodiment newly creates communication information including the creation information included in the profile and the determination information indicating that the profile deletion is to be performed, and requests the installation unit 125 to set the newly created communication information instead of the remaining communication information.

Figure 15:
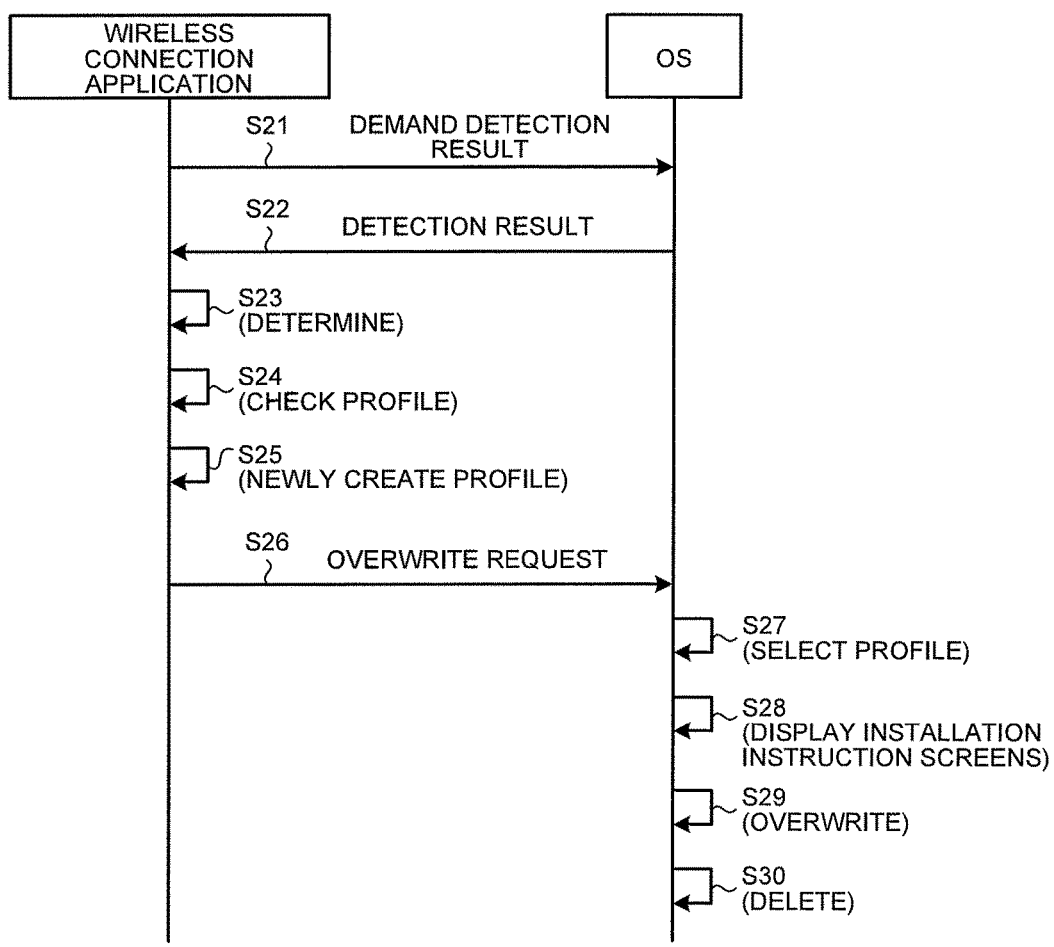
FIG. 15 is a sequence diagram illustrating an example of an operation procedure performed by the information terminal.

FIG. 15 is a sequence diagram illustrating an example of an operation procedure performed by the wireless connection application at the time of start. The started wireless connection application (the setting request unit 127) demands the OS for a detection result of the intensity of radio waves received from the wireless-communication mediation device 20 (Step S21). In response thereto, the wireless connection application receives the detection result from the OS (Step S22). Next, the wireless connection application determines whether wireless communication with the wireless-communication mediation device 20 according to the second wireless communication method has been disconnected based on the detection result received at Step S22 (Step S23). The following description is given about an example in a case where it is determined that the wireless communication with the wireless-communication mediation device 20 according to the second wireless communication method has been disconnected.

Subsequently, the wireless connection application checks whether a profile is present (remains) (Step S24). In this example, the description is given about an example in a case where a profile is present (a case where a profile remains). Next, the wireless connection application creates a new profile including the creation information included in the remaining profile and the determination information (the effective time indicating zero) indicating that the profile deletion is to be performed (Step S25). Subsequently, the wireless connection application transmits the overwrite request described above to the OS (Step S26).

The OS having received the overwrite request from the wireless connection application selects a profile including a unique ID coincident with the unique ID included in the received overwrite request from among installed profiles (Step S27). Next, the OS executes control to sequentially display the three installation instruction screens described above on the display unit 106 (Step S28). In the following descriptions, a case where an instruction to install a profile is received through the three installation instruction screens is assumed. Subsequently, the OS writes the profile newly created at Step S25 over the profile selected at Step S28 (Step S29). Then, the OS deletes the newly created profile based on the determination information indicating that the profile deletion is to be performed (Step S30).

As described above, in the present embodiment, when wireless communication with the wireless-communication mediation device 20 according to the second wireless communication method described above is disconnected, a profile including the creation information included in a profile used for the wireless communication and the determination information indicating that the profile deletion is to be performed is newly created, and the newly created profile is set instead of the former profile. The OS (the delete control unit 129) can delete the set profile by checking the determination information. Therefore, when wireless communication with the wireless-communication mediation device 20 according to the second wireless communication method is disconnected, a communication line for performing wireless communication with the wireless-communication mediation device 20 according to the second wireless communication method is not automatically established (the device is not automatically connected again to the network 80) unless a connection process in accordance with a predetermined procedure is performed again. Accordingly, the present embodiment can ensure sufficient network security.

Second Embodiment

A second embodiment of the present invention is described next. Descriptions of common parts to those in the first embodiment described above are omitted as appropriate. In the second embodiment, in a case where wireless communication with the wireless-communication mediation device 20 according to the second wireless communication method is disconnected when a window representing a display area corresponding to the wireless connection application described above transitions from a background indicating a hidden state to a foreground indicating a state where the window is displayed and where a profile is present (remains), the setting request unit 127 creates a profile including the creation information included in the remaining profile and the determination information indicating that the profile deletion is to be performed, and requests the installation unit 125 to set the created profile instead of the remaining profile. The installation unit 125 having received this request sets the profile newly created by the setting request unit 127.

In this example, at the time of start, the wireless connection application requests the OS to notify of a start signal for transitioning the wireless connection application to the foreground at a fixed interval (five minutes, for example) when the wireless connection application transitions from the foreground to the background. When detecting that the wireless connection application has transitioned from the foreground to the background, the OS transmits the start signal at the fixed interval according to the request of the wireless connection application at the time of start. The OS can detect transition of the wireless connection application from the foreground to the background by any detection method. For example, the detection method can be a method in which, when the wireless connection application transitions from the foreground to the background, the wireless connection application notifies the OS of that fact.

Figure 16:
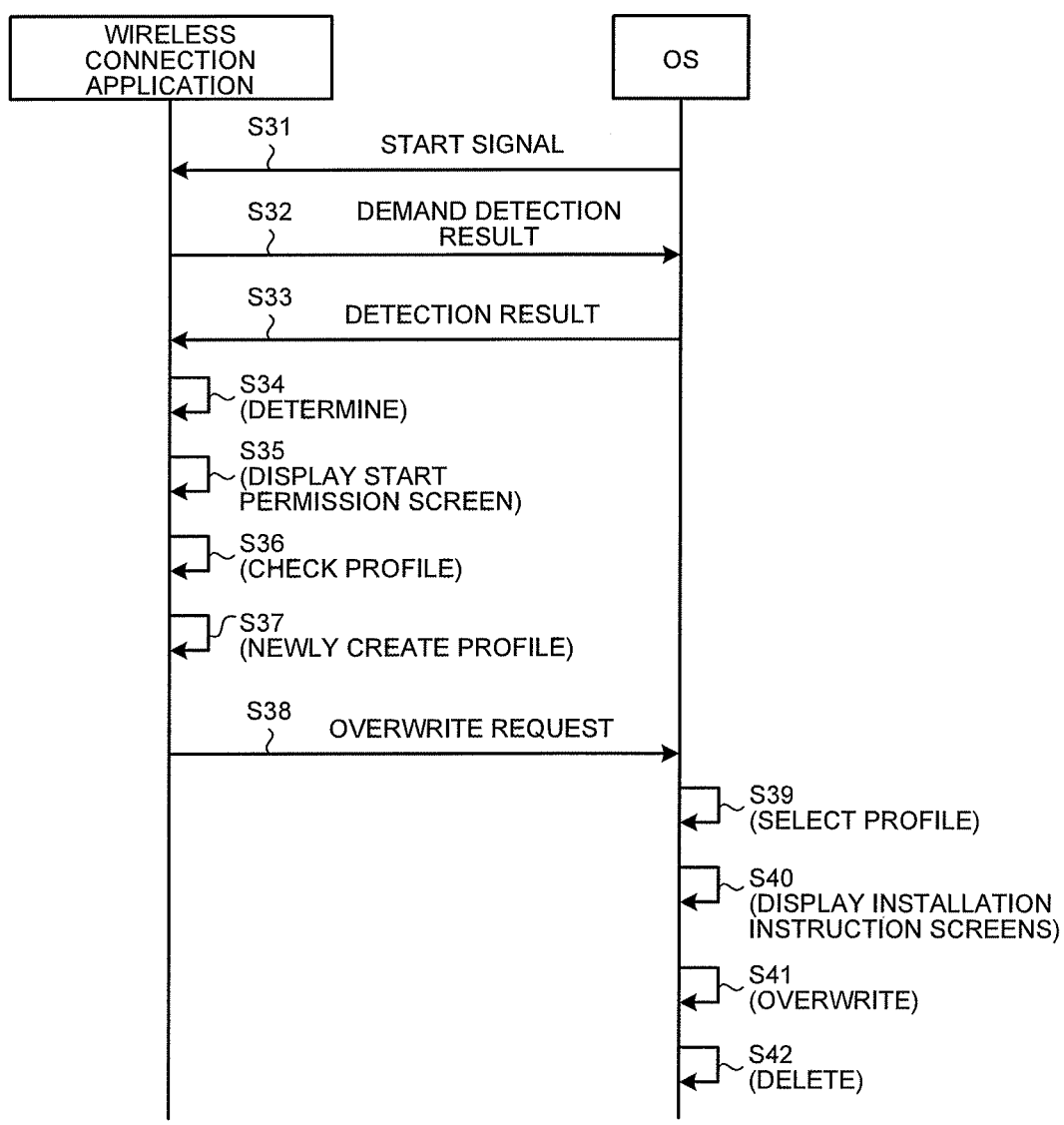
FIG. 16 is a sequence diagram illustrating an example of an operation procedure performed by the information terminal.

FIG. 16 is a sequence diagram illustrating an example of an operation procedure performed when the wireless connection application transitions from the background to the foreground. As illustrated in FIG. 16, when a timing to transmit a start signal has been reached (when a certain interval has passed), the OS transmits a start signal to the wireless connection application in the background (Step S31). The wireless connection application having received the start signal demands the OS for a detection result of the intensity of radio waves received from the wireless-communication mediation device 20 (Step S32). In response thereto, the wireless connection application receives a detection result from the OS (Step S33). Next, the wireless connection application determines whether wireless communication with the wireless-communication mediation device 20 according to the second wireless communication method has been disconnected based on the detection result received at Step S33 (Step S34). The following description is given about an example in, a case where it is determined that wireless communication with the wireless-communication mediation device 20 according to the second wireless communication method has been disconnected. When it is determined that the wireless communication is not disconnected in this example, the wireless connection application does not start and transitions to the background again.

Subsequently, the wireless connection application displays a start permission screen indicating a screen for receiving an instruction as to whether to permit transition to the foreground on the display unit 106 (Step S35). In this example, the description is given about an example in a case where an instruction to permit transition to the foreground is received on the start permission screen. In this case, the wireless connection application transitions to the foreground.

Next, the wireless connection application checks whether a profile is present (remains) (Step S36). In this example, the description is given about an example in a case where a profile is present (a case where a profile remains). Subsequently, the wireless connection application creates a new profile including the creation information included in the remaining profile and the determination information (the effective time indicating zero) indicating that the profile deletion is to be performed (Step S37). Subsequently, the wireless connection application transmits the overwrite request described above to the OS (Step S38).

The OS having received the overwrite request from the wireless connection application selects a profile including the unique ID included in the received overwrite request from among installed profiles (Step S39). Next, the OS executes control to sequentially display the three installation instruction screens described above on the display unit 106 (Step S40). In the following descriptions, a case where an instruction to install a profile is received through the three installation instruction screens is assumed. Subsequently, the OS writes the profile newly created at Step S37 over the profile selected at Step S39 (Step S41). Then, the OS deletes the newly created profile (Step S42).

In this example, it is assumed that, in the wireless connection application, the functions of the respective units described above (the display control unit 121, the acquisition unit 123, the creation unit 124, and the setting request unit 127) are provided in the foreground similarly to a normal start state, while at least the function of the setting request unit 127 described above is stopped in the background. Therefore, for example, when the first wireless communication is disconnected after the wireless connection application transitions to the background, the profile remains without being deleted.

For this reason, in the present embodiment described above, in a case where wireless communication with the wireless-communication mediation device 20 according to the second wireless communication method is disconnected when the wireless connection application transitions from the background to the foreground and where a profile is present (remains), a profile including the creation information included in the remaining profile and the determination information indicating that the profile deletion is to be performed is newly created and the newly created profile is set instead of the remaining profile. With this, the OS (the delete control unit 129) can delete the set profile based on the determination information. Therefore, an unconditional (automatic) reconnection to the network 80 in a case where the information terminal 10 disconnected from the network 80 after the wireless connection application transitions to the background enters the connection range (the second wireless communication distance) of the network 80 again can be prevented. Accordingly, the network security can be sufficiently ensured.

The programs executed by the system 1 (such as the information terminal 10) according to the embodiments described above can be configured as a file of an installable format or an executable format, to be provided by storing it on a computer readable storage medium including a CD-ROM, a flexible disk (FD), a CD-R, a digital versatile disk (DVD), a universal serial bus (USB), and the like, or can be configured to be provided or distributed via a network such as the Internet. In addition, the respective programs can be configured to be provided by being incorporated in a ROM or the like.

According to the present invention, sufficient network security can be ensured.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus that performs wireless communication with a wireless-communication mediation device that mediates connection to a network, the information processing apparatus comprising:
 a first wireless communication interface configured to perform wireless communication with the wireless-communication mediation device according to a first wireless communication method;
 a second wireless communication interface configured to perform, using first communication information, wireless communication with the wireless-communication mediation device according to a second wireless communication method different from the first wireless communication method; and
 circuitry configured to
  acquire, via the wireless communication performed by the first wireless communication interface, creation information required to create the first communication information used by the second wireless communication interface to perform the second wireless communication method,
  create the first communication information including the acquired creation information and first determination information indicating whether first communication information deletion is to be performed, and store the first communication information, in a storage device,
  establish the wireless communication with the wireless-communication mediation device according to the second wireless communication method, by using the first communication information,
  newly create, when the wireless communication with the wireless-communication mediation device according to the second wireless communication method using the first communication information has been disconnected, second communication information including the creation information included in the first communication information and second determination information indicating that second communication information deletion is to be performed, and set the newly created second communication information instead of the first communication information by overwriting the first communication information, in the storage device, with the second communication information, and delete the newly created second communication information which was set in place of, and overwrite, the first communication information, based on the second determination information included in the newly created second communication information indicating that the second communication information deletion is to be performed.

2. The information processing apparatus according to claim 1, wherein the circuitry is configured to, when receiving an instruction to disconnect wireless communication with the wireless-communication mediation device according to the second wireless communication method, create the second communication information including the creation information included in the first communication information used for the wireless communication and the second determination information indicating that the second communication information deletion is to be performed, and set the created second communication information instead of the first communication information.

3. The information processing apparatus according to claim 1, wherein the circuitry is configured to determine that wireless communication with the wireless-communication mediation device according to the second wireless communication method has been disconnected based on an intensity of radio waves received from the wireless-communication mediation device.

4. The information processing apparatus according to claim 1, wherein the circuitry is configured to, when wireless communication with the wireless-communication mediation device according to the second wireless communication method is disconnected at a time of start of an application that provides at least functions of acquiring the creation information and creating the first communication information and also when the first communication information remains, newly create the second communication information including the creation information included in the remaining first communication information and the second determination information indicating that the second communication information deletion is to be performed, and set the newly created second communication information instead of the remaining first communication information.

5. The information processing apparatus according to claim 1, wherein the circuitry is configured to, in a case where wireless communication with the wireless-communication mediation device according to the second wireless communication method is disconnected when a window representing a display area corresponding to an application for providing at least functions of acquiring the creation information and creating the first communication information transitions from a background indicating a hidden state to a foreground indicating a state where the window is displayed and also where the first communication information remains, newly create the second communication information including the creation information included in the remaining communication information and the second determination information indicating that the second communication information deletion is to be performed, and set the newly created second communication information instead of the remaining first communication information.

6. The information processing apparatus according to claim 1, wherein the creation information includes at least an SSID identifying the network, and a password indicating an encryption key.

7. The information processing apparatus according to claim 1, wherein the first and second determination information included in the first and second communication information, respectively, is an effective time indicating a time in which the communication information is effective, and the second determination information indicating that the second communication information deletion is to be performed is the effective time indicating zero.

8. The information processing apparatus according to claim 7, wherein the communication information includes at least the effective time, the SSID, and the password.

9. A computer program product comprising a non-transitory computer-readable medium including a computer program that causes a computer to execute:

acquiring, via wireless communication according to a first wireless communication method, creation information required to create first communication information used for performing wireless communication with a wireless-communication mediation device that mediates connection to a network according to a second wireless communication method different from a first wireless communication method;

creating the first communication information including the acquired creation information and first determination information indicating whether first communication information deletion is to be performed, and storing the first communication information, in a storage device;

establishing the wireless communication with the wireless-communication mediation device according to the second wireless communication method, by using the first communication information;

requesting, when wireless communication with the wireless-communication mediation device according to the second wireless communication method using the first communication information has been disconnected, basic software of the computer to newly create second communication information including the creation information included in the first communication information and second determination information indicating that second communication information deletion is to be performed, and to set the newly created second communication information instead of the first communication information by overwriting the first communication information, in the storage device, with the second communication information; and deleting the newly created second communication information which was set in place of, and overwrite, the first communication information, based on the second determination information included in the newly created second communication information indicating that the second communication information deletion is to be performed.

10. The computer program product according to claim 9, wherein, the requesting includes requesting, when an instruction to disconnect wireless communication with the wireless-communication mediation device according to the second wireless communication method is received, the basic software to newly create the second communication information including the creation information included in the first communication information and the second determination information indicating that the second communication information deletion is to be performed, and to set the newly created second communication information instead of the first communication information.

11. The computer program product according to claim 9, wherein the requesting includes determining that wireless communication with the wireless-communication mediation device according to the second wireless communication method has been disconnected based on an intensity of radio waves received from the wireless-communication mediation device.

12. The computer program product according to claim 9, wherein the requesting includes requesting, when wireless communication with the wireless-communication mediation device according to the second wireless communication method is disconnected at a time of start of the program and also when the first communication information remains, the basic software to newly create the second communication information including the creation information included in the remaining first communication information and the second determination information indicating that the second communication information deletion is to be performed, and to set the newly created second communication information instead of the remaining first communication information.

13. The computer program product according to claim 9, wherein the requesting includes requesting, in a case where wireless communication with the wireless-communication mediation device according to the second wireless communication method is disconnected when a window representing a display area corresponding to the program transitions from a background indicating a hidden state to a foreground indicating a state where the window is displayed and also where the first communication information remains, the basic software to newly create the second communication information including the creation information included in the remaining first communication information and the second determination information indicating that the second communication information deletion is to be performed, and to set the newly created second communication instead of the remaining first communication information.

14. The computer program product according to claim 9, wherein the creation information includes at least an SSID identifying the network, and a password indicating an encryption key.

15. The computer program product according to claim 9, wherein
the first and second determination information included in the first and second communication information, respectively, is an effective time indicating a time in which the communication information is effective, and
the second determination information indicating that the second communication information deletion is to be performed is the effective time indicating zero.

16. The computer program product according to claim 15, wherein the communication information includes at least the effective time, the SSID, and the password.

17. The computer program product according to claim 9, wherein the basic software is iOS.

18. An information processing method for performing wireless communication with a wireless-communication mediation device that mediates connection to a network, the method comprising:
acquiring, via wireless communication according to a first wireless communication method, creation information required to create communication information used for performing wireless communication with a wireless-communication mediation device that mediates connection to a network according to a second wireless communication method different from a first wireless communication method,
creating the first communication information including the acquired creation information and first determination information indicating whether first communication information deletion is to be performed, and storing the first communication information in a storage device;
establishing the wireless communication with the wireless-communication mediation device, according to the second wireless communication method, by using the first communication information;
newly creating, when wireless communication with the wireless-communication mediation device according to the second wireless communication method using the first communication information has been disconnected, second communication information including the creation information included in the first communication information and second determination information indicating that second communication information deletion is to be performed, to set the newly created second communication information instead of the first communication information by overwriting the first communication information, in the storage device, with the second communication information; and
deleting the newly created second communication information which was set in place of, and overwrite, the first communication information, based on the second determination information included in the newly created second communication information indicating that the second communication information deletion is to be performed.

19. The information processing method according to claim 18, wherein the newly creating includes newly creating, when receiving an instruction to disconnect wireless communication with the wireless-communication mediation device according to the second wireless communication method, the second communication information including the creation information included in the first communication information used for the wireless communication and the second determination information indicating that the second communication information deletion is to be performed, to set the newly created second communication information instead of the first communication information.

20. The information processing method according to claim 18, wherein the newly setting includes determining that wireless communication with the wireless-communication mediation device according to the second wireless communication method has been disconnected based on an intensity of radio waves received from the wireless-communication mediation device.

* * * * *